US010826984B2

(12) United States Patent
Madani (10) Patent No.: US 10,826,984 B2
(45) Date of Patent: Nov. 3, 2020

(54) EVENT STREAM PROCESSING (71) Applicant: Futurewei Technologies, Inc., Plano, TX (US)

(72) Inventor: Habib Madani, Richardson, TX (US)

(73) Assignee: Futurewei Technologies, Inc., Plano, TX (US)

( * ) Notice: Subject to any disclaimer, the term of this patent is extended or adjusted under 35 U.S.C. 154(b) by 101 days.

(21) Appl. No.: 15/961,769

(22) Filed: Apr. 24, 2018

(65) Prior Publication Data

US 2019/0327297 A1  Oct. 24, 2019

(51) Int. Cl.
*G06F 15/16* (2006.01)
*H04L 29/08* (2006.01)
*G06F 9/54* (2006.01)

(52) U.S. Cl.
CPC .......... *H04L 67/1051* (2013.01); *G06F 9/542* (2013.01); *H04L 67/1048* (2013.01)

(58) Field of Classification Search
CPC .. G06F 11/2033; G06F 11/2094; G06F 15/16; G06F 11/1425; G06F 11/1482; H04L 41/0677; H04L 41/5022; H04L 43/0817; H04L 41/082; H04L 41/0843; H04L 41/0869; H04L 67/10
See application file for complete search history.

(56) References Cited

U.S. PATENT DOCUMENTS

| 2008/0071853 | A1* | 3/2008 | Mosier ............... H04L 67/1095 709/201 |
| 2008/0071878 | A1* | 3/2008 | Reuter ............... H04L 67/1031 709/208 |
| 2011/0016123 | A1 | 1/2011 | Pandey et al. |
| 2012/0151272 | A1* | 6/2012 | Behrendt ............... G06F 9/542 714/39 |

(Continued)

FOREIGN PATENT DOCUMENTS

CN  107077476 A  8/2017

OTHER PUBLICATIONS

"International Application No. PCT/CN2019/083451, International Search Report and Written Opinion dated Jul. 25, 2019", (Jul. 25, 2019), 9 pgs.

(Continued)

*Primary Examiner* — Cheikh T Ndiaye
(74) *Attorney, Agent, or Firm* — Schwegman Lundberg & Woessner, P.A.

(57) ABSTRACT

Systems and methods are provided to process an event stream using nodes arranged as a cluster in which the nodes are in a leader-follower relationship with one node being the leader at any given time. Tracking of node membership and leadership status can be conducted in a manager node for a variety of applications. Each node of the cluster can register in the manager node and can receive the same set of event streams as the other nodes of the cluster. The leader node can process an event of an event stream with the follower nodes (Continued)

tracking the processing by the leader node, where the leader node can publish the processed event. Leadership can be changed from the leader node to another node of the cluster based on a performance criterion of the leader node. Additional systems and methods can be implemented in a variety of applications.

20 Claims, 5 Drawing Sheets

(56) References Cited

U.S. PATENT DOCUMENTS

| | | | | |
|---|---|---|---|---|
| 2012/0311003 | A1* | 12/2012 | Kuznetsov | G06F 16/176 707/827 |
| 2016/0085809 | A1 | 3/2016 | De Castro Alves et al. | |
| 2017/0366619 | A1* | 12/2017 | Schreter | H04L 67/10 |
| 2018/0046511 | A1 | 2/2018 | Park et al. | |
| 2018/0091586 | A1* | 3/2018 | Auradkar | H04L 67/1004 |
| 2018/0302270 | A1* | 10/2018 | Schreter | H04L 41/0668 |

OTHER PUBLICATIONS

"Eventual consistency", Wikipedia® [online]. [retrieved on Mar. 18, 2017] Retrieved from the Internet: <URL: https://web.archive.org/web/20170318080828/https://en.wikipedia.org/wiki/Eventual_consistency>, (2017), 3 pgs.

"Microservice Architecture", © 2017 Chris Richardson. [online]. [archived on Mar. 5, 2017]. Retrieved from the Internet: <URL: https://web.archive.org/web/20170305065423/http://microservices.io>, (2017), 6 pgs.

* cited by examiner

EVENT STREAM PROCESSING

FIELD OF THE INVENTION

The present disclosure is related to data communication and, in particular, event streaming.

BACKGROUND

Software defined networks (SDNs) and Internet of things (IoT) networks are maturing and transforming with respect to scale and geographical-distribution (geo-distribution). Practical deployments, which should include integration with existing and legacy networks, need to accompany such transformations. SDN and IoT networks are centralized and use one-to-one client-server connections to communicate. As a result, for these centralized controlling applications, event streaming and intelligent processing of streaming data across data plane, control plan, and management are cumbersome. An event is an identifiable occurrence that is recognized by system hardware or software. An event can be a message, token, count, pattern, or a value that can be detected within an ongoing stream of monitored inputs such as network traffic or other inputs. An event stream is a set of data, processed element by element, where each element represents an event. An event stream may, possibly, include infinite datasets. In some instances, an event may be a significant change of status. For example, with respect to a car purchase, the car's status changes from "for sale" to "sold." Event stream processing is a method of tracking and analyzing streams of data about things that happen (events), from which a conclusion from the data may be derived.

A virtualized network function, or VNF, is responsible for handling specific network functions that run in one or more virtual machines (a virtual machine being a self-contained operating environment that behaves as if it is a separate computer) on top of a hardware networking infrastructure, which can include routers, switches, servers, cloud computing systems, and more. VNFs can move individual network functions out of dedicated hardware devices into software that can run on commodity hardware. Many VNF deployments are becoming cloud-based.

Typically, the term "cloud" with respect to data processing and communicating refers to a datacenter full of servers that is connected to the Internet. However, cloud may refer to any network or combinations of networks. A cloud can include a wide area network (WAN) like the public Internet or a private, national or global network, and may include a local area network (LAN) within an organization providing the services of the datacenter. In addition, the term "cloud computing" refers to the software and services executed for users by these servers, and typically the user is unaware of the physical location of the servers or datacenter. Further, the datacenter may be a distributed entity. Cloud computing can provide shared computer processing resources and data to computers and other devices on demand over the associated networks.

With cloud-based VNF deployments, event streaming based interconnect is becoming a significant part of cloud architectures. Current methods of event stream processing use a load balancer, which hides the actual service behind the load balancer. A load balancer accepts incoming, discretely-sourced event streams, and separates them into streams by dividing the streams into different so-called partitions based on stream topics and, optionally, other factors. A partition can be implemented by a first-in, first-out queue, for instance, so that as each packet for a partition is received it is inserted into the tail of that partition's queue. Further, event stream-based services may need to handle dynamic stream subscriptions, which would not be possible with a typical load balancing scheme.

Publish-subscribe is a messaging pattern where senders of messages, called publishers, do not program the messages to be sent directly to specific receivers, called subscribers, but instead categorize published messages into classes without knowledge of which subscribers, if any, there may be. Similarly, subscribers express interest in one or more classes and only receive messages that are of interest, without knowledge of which publishers, if any, there are. Publish-subscribe is an implementation method that can be used to subscribe event streams as topics. Each topic represents a type of event. A system can comprise publishers and subscribers that can produce and consume N-1, N-N, and 1-1 event streams of many types of topics. In the publish-subscribe model, subscribers typically receive only a subset of the total messages published. The process of selecting messages for reception and processing is called filtering. There are two common forms of filtering: topic-based and content-based.

In a topic-based system, messages are published to "topics" or named logical channels. Subscribers in a topic-based system will receive all messages published to the topics to which they subscribe, and all subscribers to a topic will receive the same messages. The publisher is responsible for defining the classes of messages to which subscribers can subscribe. Generally speaking, a stream topic is a label or identifier for a stream. In some embodiments, a stream topic comprises an identifier of the protocol of information carried in the payload of packets of the stream and the source network address of packets in the stream. In a content-based system, messages are only delivered to a subscriber if the attributes or content of those messages match constraints defined by the subscriber. The subscriber is responsible for classifying the messages.

Stream processors can be implemented as microservices, which desirably provides a "service" with high reliability. A microservice architecture structures an application as a collection of coupled services, which implement a number of capabilities. A microservice architecture can enable continuous delivery and deployment of large, complex applications and can enable an organization to evolve its technology stack. Each component of a microservice architecture may be a microservice. With the microservices approach, services can come and go out of system relatively quickly, which can hinder growth and management of the service. Also, typical clustering approaches implement service applications as part of significant amount of middleware. Middleware is a software layer situated between applications and operating systems, and is typically used in distributed systems to hides intricacies of distributed applications and differences of hardware, operating systems, and protocols.

SUMMARY

Systems and methods can be implemented to process event streams using a cluster of nodes, with the nodes arranged in a leader-follower relationship in conjunction with a manager node that coordinates membership of nodes in the cluster and leadership status of the nodes. The cluster can process the received event streams by operation of the leader node of the cluster on the received event stream with the follower nodes tracking the processing by the leader node. The tracking of the processing by the leader node can be facilitated by the leader node establishing synchronization with the follower nodes of the cluster. Leadership can be changed from the leader node to a follower node of the cluster based on a performance criterion of the leader node, where the sequencing of leadership from one node to another of the cluster is maintained in the manager node.

According to one aspect of the present disclosure, there is provided a system operable to handle event streams for processing, the system comprising: a memory storage comprising instructions; and one or more processors in communication with the memory storage, wherein the one or more processors execute the instructions to perform operations comprising management of a cluster of nodes to: register each node of the cluster in which each node receives a stream of events, the stream of events being common to each node in the cluster; maintain a data structure for each node of the cluster that identifies each respective node as a leader node or a follower node, with the cluster having one leader node at a given time; receive a published output event topic from the leader node; and change leadership status from the leader node to another node of the cluster based on a performance criterion of the leader node.

Optionally, in any of the preceding aspects, another implementation of the aspect provides that the system includes the cluster of nodes with the leader node arranged to process the stream of events and to synchronize processing of the stream of events with the other nodes of the cluster, the other nodes of the cluster maintaining a database of events with respect to the stream of events to track processing by the leader node.

Optionally, in any of the preceding aspects, a further implementation of the aspect provides that the leader node is arranged to synchronize processing of each event in the stream with the other nodes of the cluster, using a unique identifier for each event in the stream.

Optionally, in any of the preceding aspects, a further implementation of the aspect provides that the stream of events includes at least one event topic that is different from other event topics of the stream.

Optionally, in any of the preceding aspects, a further implementation of the aspect provides that the performance criterion of the leader node comprises the leader node terminating activity, the leader node operating at a rate less than a threshold for a node to operate on an event, or the leader node exceeding a time to live for the leader node.

Optionally, in any of the preceding aspects, a further implementation of the aspect provides that a particular data structure of a particular node includes a service identification of a service being provided, a time to live for the particular node, a node identification of the particular node, and a sequence number for the particular node indicating a ranking of the particular node among the nodes of the cluster for operation as a leader node.

Optionally, in any of the preceding aspects, a further implementation of the aspect provides that the data structure includes cluster information about the cluster.

Optionally, in any of the preceding aspects, a further implementation of the aspect provides that the cluster is one of a plurality of clusters being managed by the system.

According to one aspect of the present disclosure, there is provided a computer-implemented method comprising: registering, in a manager node, each node of a cluster of nodes in which each node receives a stream of events, the stream of events being common to each node in the cluster; maintaining, in the manager node, a data structure for each node of the cluster that identifies each respective node as a leader node or a follower node with the cluster having one leader node at a given time; receiving, in the manager node, a published output event topic from the leader node; and changing leadership status, in the manager node, from the leader node to another node of the cluster based on a performance criterion of the leader node.

Optionally, in any of the preceding aspects, another implementation of the aspect provides that the method includes: processing the stream of events by the leader node of the cluster of nodes; publishing from the leader node an output event topic; and synchronizing the processing of the stream of events by the leader node with the follower nodes of the cluster.

Optionally, in any of the preceding aspects, a further implementation of the aspect provides that the computer-implemented method includes maintaining a database of events in each follower node, with respect to the stream of events, to track processing by the leader node.

Optionally, in any of the preceding aspects, a further implementation of the aspect provides that synchronizing the processing of the stream of events by the leader node with the follower nodes of the cluster includes generating a control event stream from the leader node to each follower node of the cluster for an event of an event stream being processed, the control event stream having a unique identifier for the event of the stream being processed by the leader node.

Optionally, in any of the preceding aspects, a further implementation of the aspect provides that the computer-implemented method includes changing leadership from the leader node to a follower node in response to performance of the leader node matching a performance criterion.

Optionally, in any of the preceding aspects, a further implementation of the aspect provides that matching the performance criterion of the leader node includes matching the leader node terminating activity, the leader node operating at a rate less than a threshold for a node to operate on an event, or the leader node exceeding a time to live for the leader node.

Optionally, in any of the preceding aspects, a further implementation of the aspect provides that changing leadership from the leader node to the follower node includes setting a follower node to leadership of the cluster based on a sequence contained in the manager node.

Optionally, in any of the preceding aspects, a further implementation of the aspect provides that the computer-implemented method includes managing a plurality of clusters by the manager node.

According to one aspect of the present disclosure, there is provided a non-transitory computer-readable storage device comprising instructions, which when executed by a set of processors, cause a system to perform operations, the operations comprising: registering, in a manager node, each node of a cluster of nodes in which each node receives a stream of events, the stream of events being common to each node; maintaining, in the manager node, a data structure for each node of the cluster that identifies each respective node as a leader node or a follower node with the cluster having one leader node at a given time; receiving, in the manager node, a published output event topic from the leader node; and changing leadership status, in the manager node, from the leader node to another node of the cluster based on a performance criterion of the leader node.

Optionally, in any of the preceding aspects, another implementation of the aspect provides that the operations include: processing the stream of events by the leader node of the cluster of nodes; publishing from the leader node an output event topic; and synchronizing the processing of the stream of events by the leader node with the follower nodes of the cluster.

Optionally, in any of the preceding aspects, a further implementation of the aspect provides that the operations include maintaining a database of events in each follower node, with respect to the stream of events, to track processing by the leader node.

Optionally, in any of the preceding aspects, a further implementation of the aspect provides that the operations include changing leadership from the leader node to a follower node in response to performance of the leader node matching a performance criterion.

Any one of the foregoing examples may be combined with any one or more of the other foregoing examples to create a new embodiment within the scope of the present disclosure.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the embodiments, and it is to be understood that other embodiments may be utilized and that structural, logical and electrical changes may be made. The following description of example embodiments is, therefore, not to be taken in a limited sense.

The functions or algorithms described herein may be implemented in software in an embodiment. The software may consist of computer executable instructions stored on computer readable media or computer readable storage device such as one or more non-transitory memories or other type of hardware based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

Computer-readable non-transitory media includes all types of computer readable media, including magnetic storage media, optical storage media, and solid state storage media and specifically excludes signals. It should be understood that the software can be installed in and sold with the devices that handle event streams as taught herein. Alternatively, the software can be obtained and loaded into such devices, including obtaining the software via a disc medium or from any manner of network or distribution system, including, for example, from a server owned by the software creator or from a server not owned but used by the software creator. The software can be stored on a server for distribution over the Internet, for example.

In various embodiments, a clustering method and apparatus can be implemented to provide a mechanism to achieve efficient service specific, reliable event stream processing. A cluster mechanism for providing an event streaming based service application can be structured to generate a highly available event stream processing service. The highly available characteristic of the clustering mechanism can be achieved by structuring each node of a cluster of nodes to receive the same event stream. A node, herein, is an entity that can subscribe and process topic based data event streams. The entity can be a software application responsible for a particular service task. Such service tasks can include a management task, a service function task, or a microservices task. With the event stream common to all nodes of the cluster, when processing of the event stream by one node is slowed down or terminated, the processing can be continued at another node of the cluster. A node of a cluster can be referred to as a cluster node. Availability increases with increased number of nodes in the cluster.

A cluster, as used in the architecture taught herein, can represent a group of applications or apparatus as member nodes. The member nodes can be operated as a leader node, which may also be referred to as a master node, and a group of follower nodes. With the same event stream being provided to the leader node and the follower nodes, each of these nodes is an event streaming node. Each member node of the cluster can synchronize certain stored data among all cluster nodes. A synchronous action conducted by a system is completed before proceeding to another task. With respect to asynchronous operation conducted by a system, an asynchronous action can be incomplete and/or in progress as the system proceeds to operate on another task.

Identification of the leader node and the follower nodes of the cluster can be handled in a service node registry of a manager node. The manager node can be separate from the leader and follower nodes. The service node registry of the manager node can be used to maintain an identification (ID) of a master/leader node and follower nodes of a given cluster. Each member node of the cluster can be arranged to operatively communicate with the manager node, and each member node of the cluster can be arranged to operatively communicate with the leader of the cluster. This communication can be controlled to optimally maintain and synchronize an event database in each event streaming node in the cluster.

Though each event streaming node in the cluster maintains a synchronized event database, processing of the event stream may occur in the leader node. The processing of the event stream may be limited to the leader node. The status of the leader node can change through interaction with the manager node such that the leader node becomes a follower node and one of the previous set of follower nodes of the cluster becomes a leader node to process the event stream input to the cluster. With the nodes of the cluster synchronized, the newly appointed leader node can continue processing event streams input to the cluster with the other nodes of the cluster, being follower nodes, tracking the processing by the leader node. The arrangement of the nodes of the cluster with the manager node provides a mechanism to dynamically grow and maintain the cluster as a service cluster for event stream processing.

Figure 1:
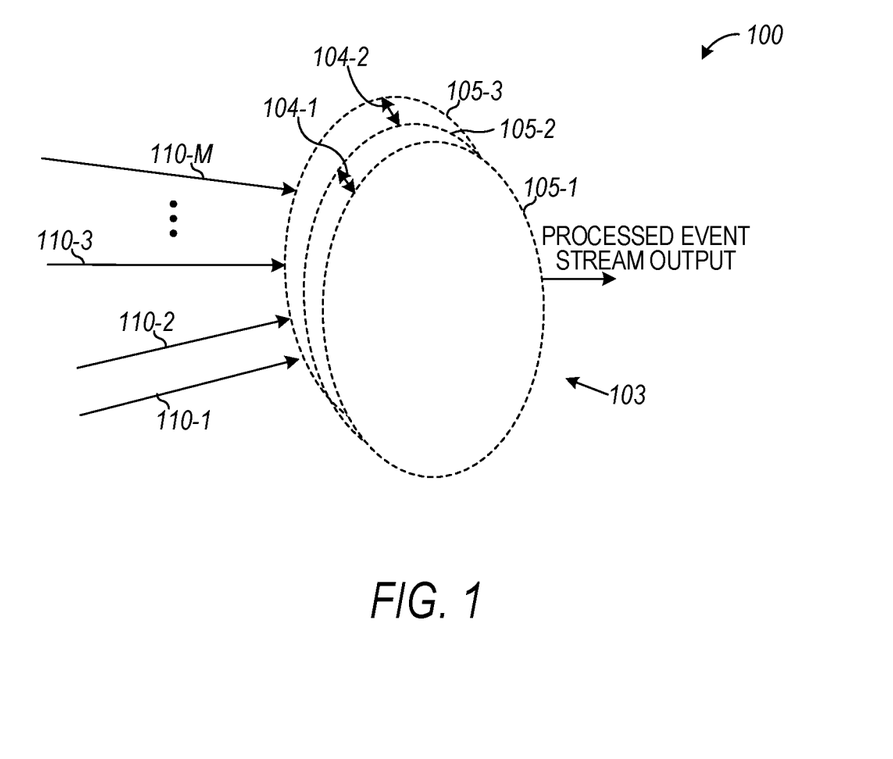
FIG. 1 is a high-level representation of an architecture having a cluster of nodes to provide a processed event of a topic in a received event stream as an output from the cluster, according to an example embodiment.

FIG. 1 is a high-level representation of an architecture 100 having a cluster 103 of nodes 105-1, 105-2, and 105-3 to provide a processed event of a topic in a received event stream as an output from cluster 103. Cluster 103 can generate an output of a processed event stream for each of event streams 110-1, 110-2, 110-3 . . . 110-M input to cluster 103. Although cluster 103 is shown as having three nodes, cluster 103 can have more or less than three nodes. Each node of nodes 105-1, 105-2, and 105-3 can be application nodes and can be configured to receive the same event stream. One or more of event streams 110-1, 110-2, 110-3 . . . 110-M can be an event stream having n topics. Event streams 110-1, 110-2, 110-3 . . . 110-M can be streams of event topics in which the number of topics among the event streams 110-1, 110-2, 110-3 . . . 110-M can vary, with each event stream 110-1, 110-2, 110-3 . . . 110-M input to each of nodes 105-1, 105-2, and 105-3.

Cluster 103 of nodes 105-1, 105-2, and 105-3 can be structured in a unique way to separate out a leader node of cluster 103 through use of a manager entity (not shown). For example, node 105-2 may be made the leader node to operate as a service processor. An election process can be executed to elect node 105-2 as the leader node. The manager entity can track and manage election of a leader node from among nodes 105-1, 105-2, and 105-3 using a data structure maintained by the manager entity for each of nodes 105-1, 105-2, and 105-3. Nodes 105-1, 105-2, and 105-3 of cluster 103 can be synced to provide a publish-subscribe processing of event streams that are ingress to cluster 103 with the leader node publishing each processed event stream as an output of cluster 103 and with the other nodes of cluster 103 tracking the processing by the leader node. The sync process can be implemented as an inter-node synchronization 104-1 and 104-2 of nodes 105-1 and 105-3, respectively, with the leader node 105-2 of cluster 103.

Figure 2:
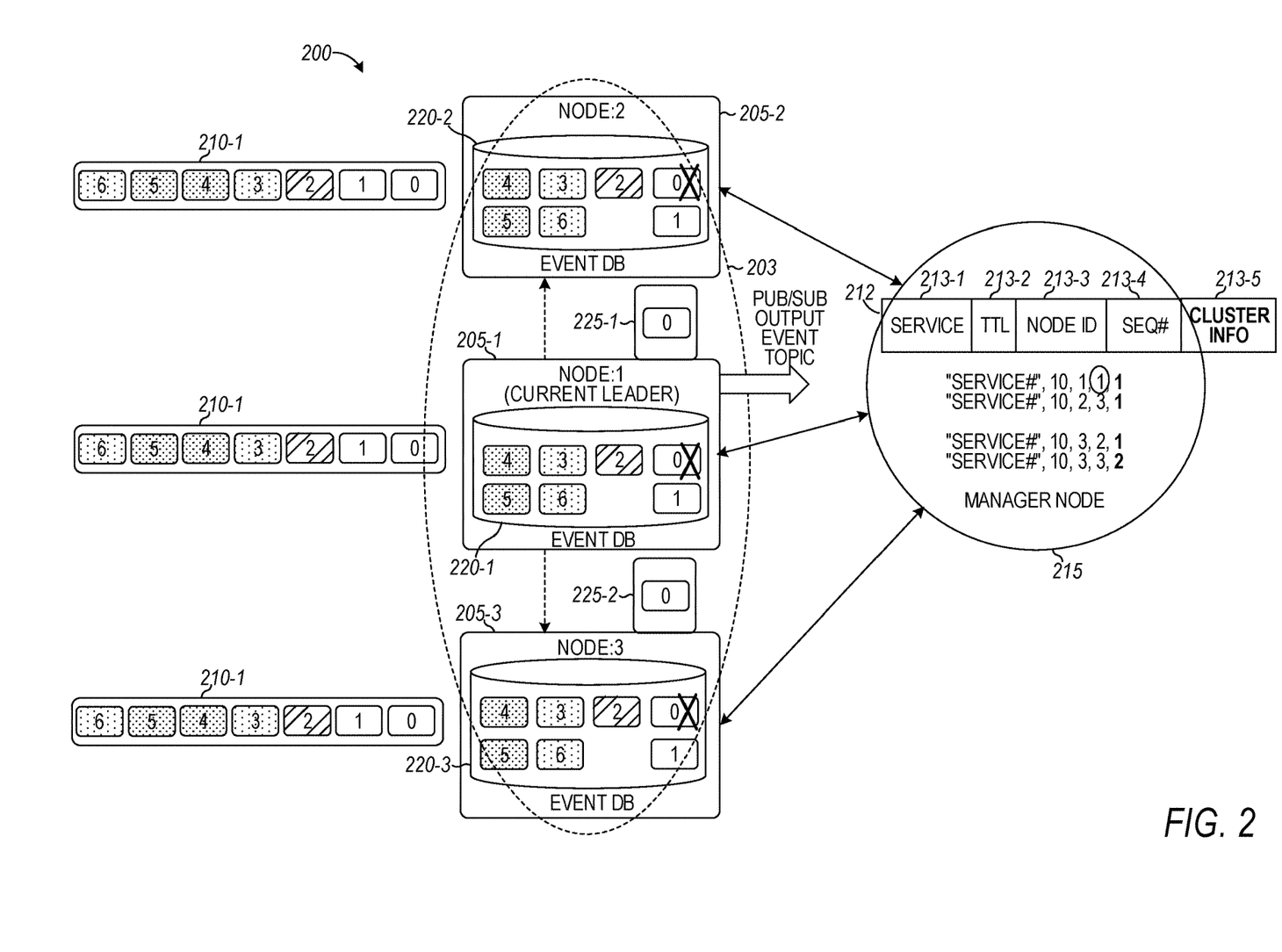
FIG. 2 is an example of an architecture having a cluster and a manager node to manage leadership of the cluster, according to an example embodiment.

FIG. 2 is an example of an embodiment of an architecture 200 having a cluster 203 and a manager node 215 to manage leadership of cluster 203. Manager node 215 tracks and maintains membership and leadership of nodes belonging to cluster 203. In this example, cluster 203 include nodes 205-1, 205-2, and 205-3. Nodes 205-1, 205-2, and 205-3 can operate with bidirectional communication between nodes 205-1, 205-2, and 205-3 and manager node 215. Though cluster 203 is shown as having three nodes, cluster 203 can have more or less than three nodes. When a node is added to cluster 203 to participate in publish-subscribe of topics of event streams to cluster 203, the newly added node registers with manager node 215.

Manager node 215 can maintain a service node registry that tracks each node of cluster 203 with respect to parameters stored in the service node registry, where the parameters provide data about the individual nodes of cluster 203 and the event streams being serviced by cluster 203. In addition, manager node 215 can also track other clusters by maintaining data in the service node registry of manager node 215 for the nodes of the additional clusters. The parameters stored in the service node registry of manager node 215 can include cluster information such as, but not limited to, cluster identifications, identifications of services being processed by clusters managed by manager node 215, one or more characteristics for a leader node of each cluster being managed by manager node 215, node identifications for each node of each cluster being managed by manager node 215, or a sequence number or identification of leadership order for each node for each cluster managed by manager node 215. The parameters stored by manager node 215 may include other data regarding clusters, nodes of the clusters, and event streams to the clusters.

Cluster 203 can include, at any one time during processing event streams, a leader node and at least one follower node. However, the cluster may be constructed by starting out with one node. Determination of the node of cluster 203 for leader status can include the node for leadership of cluster 203 selected by consistent periodic polling. Leadership tracking can be implemented through consistent access to a sequencing data structure. Manager node 215 can maintain, for each node of cluster 203, a data structure 212 including a service field 213-1, a time to live (TTL) field 213-2, a node ID field 213-3, a sequence field 213-4, and a cluster information field 213-5. Though fields 213-1, 213-2, 213-3, 213-4, and 213-5 are shown in a specific order, these fields in data structure 212, in general, are not limited to a specific order, but can be changed depending on the circumstances in which they are implemented. TTL is a numeric value indicating an expiration time. Herein, it represents an expiration time of the leadership status of a node.

The sequence field 213-4 in data structure 212 for a given node provides a position of the node in an order of leadership status. For a cluster of n nodes, the leadership status can range from one to n, where one is the current leader and n is the nth node in the cluster to attain leadership after a preceding leader ends its leadership status. The node with the lowest number in the sequence of numbers in sequence field 213-4 for nodes of a cluster is the leader at a given time, with each node of the cluster tracking the sequence of numbers in its data structure 212 for the respective node to become the leader in a guaranteed manner. The tracking can be performed in a continuous manner or in a polling manner. Alternatively, leadership status may be attributed to the node with the highest number in the range with one being the nth node in the cluster to attain leadership after a preceding leader ends its leadership status.

In FIG. 2, four sets of parameters for data structures for each of four nodes, are shown as an example with the parameters listed from left to right as entries for fields 213-1, 213-2, 213-3, 213-4, and 213-5, respectively. The four nodes are listed with node IDs of 1, 2, and 3 for their respective field 213-3. Other formats may be used for the node IDs. In the set of parameters, the parameter for field 213-5 is a cluster ID as cluster information in this example. The four sets of parameters are for two clusters with cluster IDs of 1 and 2, in which cluster 1, which is cluster 203, includes nodes 1 (node 205-1), 2 (node 205-2), and 3 (node 205-3). In the four sets of parameters shown, only node ID 3 is shown for cluster 2.

In each set of parameters, the service number for field 213-1 is not shown for this example highlighting use of a sequencing data structure. The service number can be used to identify a topic of an event stream input to each of nodes 205-1, 205-2, and 205-3 of cluster 203 along with a topic for the node labeled 3 for cluster 2. The service number can be a numerical number identifying a topic, or, alternatively, it may be another form of identification that can distinguish between different topics. Each of the four sets of parameters has a TTL of 10 units of time for their respective 213-2 fields for the four respective nodes. However, each node may have a different TTL than the other nodes of cluster 203.

The shown sets of parameters for cluster 1 (cluster 203) list the leadership sequence for nodes 1 (node 205-1), 2 (node 205-2), and 3 (node 205-3) as node 1 being the current leader (shown circled), while nodes 2 and 3 are currently follower nodes. If a certain performance criterion occurs for node 1, node 1 no longer is the leader node of cluster 1, and the leader node becomes node 3. That is, in the current leader sequencing, the sequencing of leadership status runs from node 1 to node 3 to node 2. The performance criterion of the leader node can include the leader node terminating activity, the leader node operating at a rate less than a threshold for a node to operate on an event, or the leader node exceeding its TTL.

Manager node 215 maintains the data structure 212 for each node of each cluster registered in manager node 215 to provide a locking mechanism to avoid split control by different cluster nodes or a deadlocking of multiple client node access and update. Synchronization of a common leader sequencing data structure in manager node 215 can be attained with leadership registration and refreshing by each node 205-1, 205-2, and 205-3 of cluster 203 with manager node 215. Each node 205-1, 205-2, and 205-3 of cluster 203 can access the leadership data structures through an application programming interfaces (API) call for retrieving the sequence number and updating the other fields. An API is software that allows two applications to communicate with each other. To continue to maintain leadership status, the leader node can update its corresponding TTL field 213-2 in its data structure 212, before the TTL expires.

To join cluster 203, a node will follow the mechanism discussed above to register with manager node 215 and communicate on a continuous or polling pattern to follow the leadership sequencing maintained in manager node 215. This technique for growing a cluster can keep the cluster leader node relationship functioning. The sequencing data structure of the nodes for leadership can follow Paxos or Raft type protocols. Paxos is a family of protocols to provide consensus in a network of processors, where consensus is the process of agreeing on one result among a group of participants. Consensus protocols are the basis for the state machine replication approach to distributed computing. State machine replication is a technique for converting an algorithm into a fault-tolerant, distributed implementation. The Paxos protocols, which can provide consistency, can include trade-offs between the number of processors, number of message delays before learning the agreed value, the activity level of individual participants, number of messages sent, and types of failures. Raft, for computing systems, is a consensus algorithm designed as an alternative to Paxos to provide a generic way to distribute a state machine (mathematical model of computation) across a cluster of computing systems, ensuring that each node in the cluster agrees upon the same series of state transitions. Raft achieves consensus via an elected leader to implement consensus. The cluster has one and only one elected leader which is fully responsible for managing log replication on the other computing systems of the cluster.

As shown in FIG. 2, the same event stream 210-1 is input to each cluster node of cluster 203. Event stream 210-1 can be registered with a service number in field 213-1 of data structure 212 in manager node 215 for each of nodes 205-1, 205-2, and 205-3. Event stream 210-1 can include a number of different topics having a number of different instances of each topic in event stream 210-1. In this example, events labeled 0 and 1 can be of a first topic, event labeled 2 can be of a second topic, events 3 and 6 can be of a third topic, and events 4 and 5 can be of a fourth topic. Each cluster node can receive a complete set of service event topics as a publish-subscribe subscription. The cluster nodes of cluster 203 can receive the same set of event stream topics through asynchronous eventually consistent publish-subscribe. Eventual consistency is a consistency model used in distributed computing to achieve high availability that informally guarantees that, if no new updates are made to a given data item, eventually all accesses to that item will return the last updated value. Eventually consistent publish-subscribe of all related event streams can follow a gossip protocol. A gossip protocol is a communication protocol that provides a procedure or process of computer-computer communication, which is disseminates information based on the manner in which epidemics spread.

Node 205-1, node 205-2, and node 205-3 can include event database (DB) 220-1, event DB 220-2, and DB 220-3, respectively. The events 0-6 from common event stream 210-1 can be stored in each of event database (DB) 220-1, event DB 220-2, and DB 220-4 and the events of the same topic can be grouped together or indexed as being related in each of these databases. Access to and from each of event DB 220-1, event DB 220-2, and DB 220-4 can be executed by one or more processes for each of nodes 205-1, 205-2, and 205-3. Alternatively, each node 205-1, 205-2, and 205-3 can operate on a portion of a common database with one or more processors executing access for all the cluster nodes.

The leader node of cluster 203, for example node 205-1 as the current leader, may be operated as the only active node that processes the events of event stream 210-1. The other nodes of cluster 204 (nodes 205-2 and 205-3), which are follower nodes, perform a minimum function of DB maintenance that includes tracking the processing by the leader node. This allocation of service processing by one cluster node provides an overall efficient resource utilization with respect to a central processing unit (CPU), which can include a set of one or more processors, and memory. Current leader node 205-1 can synchronize with all other follower cluster nodes, 205-2 and 205-3, for any processed events from the event stream by publishing updates, for example, delete or change updates. The delete or change updates can be published by only passing the event topic processed by leader node 205-1 by passing an event key ID for the event topic using an eventually consistent publish-subscribe procedures. Publish-subscribe based inter-cluster node synchronization from leader node 205-1 to follower nodes 205-2 and 205-3 may be implemented following a gossip protocol.

As an example of leader to follower synchronization, FIG. 2 shows that after event 0 is processed by leader node 205-1, leader node 205-1 deletes event 0 in event DB 220-1. Leader node 205-1 generates a control event stream 225-1 with an event key ID for event 0 to node 205-2. Upon reception of the event key ID from the leader initiated message transmission from leader node 205-1, follower node 205-2 deletes event 0 from event DB 220-2. In this operation, node 205-2 is a passive follower node that only maintains event DB 220-2 with respect to event stream processing. Leader node 205-1 also generates a control event stream 225-2 with an event key ID for event 0 to node 205-3. Upon reception of the event key ID from the leader initiated message transmission from leader node 205-1, follower node 205-3 deletes event 0 from event DB 220-3. In this operation, node 205-3 is a passive follower node that only maintains event DB 220-3 with respect to event stream processing. With additional cluster nodes in cluster 203, leader node 205-1 generates a control event stream with an event key ID for event 0 to these additional cluster nodes, where event 0 is deleted from the event databases associated with these additional nodes.

With leader node 205-1 synchronized with the follower nodes of cluster 203, the follower nodes track the processing of event stream 210-1. With this tracking, whichever node of the follower nodes is next in the leadership sequencing can continue the processing of event stream 210-1 when leader node 205-1 no longer functions in a leadership capacity. This automatic transferral of service processing provides increased availability for cluster 203. With increased number of follower nodes, the availability of cluster 203 increases. Architecture 200 with a single leader and one or more follower nodes to create a cluster of publish-subscribe event stream processing with an efficient inter-node synchronization for event DB provides a mechanism to provide high availability.

The leadership capabilities include the leader node processing the events of event stream 210-1 according to the topics in event stream 210-1 and, as each event of a topic is processed, the leader node outputs the processed event of the topic to manager node 215. Manager node 215 can handle the received processed event according to the topic of the event, which can include providing the processed event to a client of the system having architecture 200. Alternatively, the leader node can provide the processed event to a client of the system having architecture 200.

Architecture 200 of FIG. 2 depicts deployment of a 1-to-2 redundancy scheme, provided by one leader node whose functions can be transferred to one of two nodes, which can scale to n nodes providing a 1-to-(n−1) redundancy scheme, which can provide high availability. The leader node, which is a master node, can synchronize with peer follower nodes. The peer follower nodes can be passive for streaming processing, but receive and update their event DBs. Each of the follower nodes can also periodically communicate with a manager node to determine whether the respective follower node is in line to become the next leader/master. In this unique approach, there is no load balancer in the middle between event streams and clients to receive the events in the event streams. Such an approach can also avoid the tiered hierarchy associated with a load balancer, inefficient copy of all streams and push as a Nxn process associated with some applications of a load balancer, lack of processing synchronization of nodes associated with application of a load balancer, inefficient grouping of stream service-specific processing associated with a load balancer, and the mostly synchronous transmission control protocol (TCP) oriented communication associated with application of a load balancer.

Figure 3:
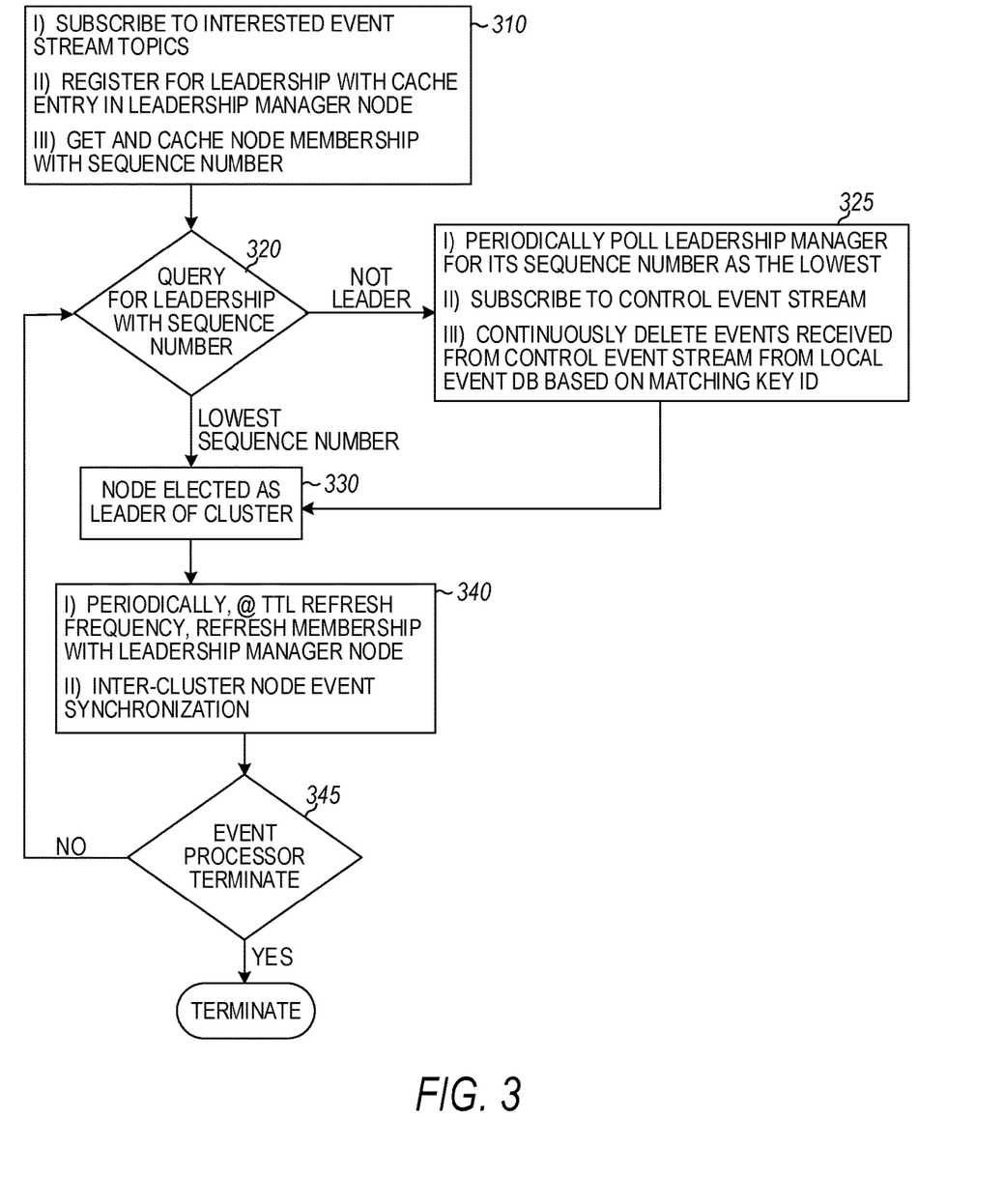
FIG. 3 illustrates activities of a representative node that enters a cluster as a member of the cluster, according to an example embodiment.

FIG. 3 illustrates activities of a representative node that enters a cluster as a member of the cluster, such as the nodes associated with FIGS. 1 and 2. At 310, the representative node first subscribes to topics for which there is interest by a user and for which events of the topic are transported in an event stream. The representative node can register for leadership in a cluster of nodes, where the cluster receives and processes the event stream. The registration can be maintained in a cache entry in a manager node that operates as a manager of membership in the cluster and of leadership of the cluster. The cache entry may be made in a data structure such as data structure 212 of FIG. 2. From the manager node, the representative node obtains and caches its node membership with a sequence number that allocates a position for the representative node in the leadership hierarchy or queue. This queue is a listing of which node of the cluster is the cluster leader and the order in which leadership is passed to other nodes of the cluster. In an embodiment, the representative node may also cache the sequence number of the current leader obtained from communication with the manager node.

At 320, the representative node can query the manager node for leadership with its sequence number. This query can be part of a polling that is performed at a frequency that allows for leadership to be passed to the representative node with minimum delay to the processing of the event stream. The polling frequency can be configurable and may have a default. The default value of the polling frequency may be, but is not limited to, five seconds. Passing the leadership from the current leader node to the representative node is conducted if the representative node is the node following the current leader node in the sequence and the leader node is relinquishing its leadership status.

At 325, having determined that it is not the leader, the representative node continues to periodically poll the manager node for leadership. The representative node polls to determine if its sequence number is the lowest number in the sequence for active nodes maintained by the manager node. With the leader node not relinquishing its role as leader or with the sequence number of the representative node not being the lowest, the representative node continues to operate as a follower node. As a follower node, the representative node subscribes to a control event stream from the leader node. A task of the representative node as a follower node is to continuously delete events from its local event DB based on matching a key ID for each event received in the control event stream from the leader node, which indicates that the leader node has completed operation on the identified event. In this manner, the representative node tracks the processing of the event stream by the leader node, without actively processing the event stream. The processing of the event stream can be limited to the node of the cluster that is the leader node of the cluster, where the cluster has one leader node at any given time.

At 330, with the query at 320 having resulted in the representative node having determined that its sequence number in the sequence of active nodes maintained by the manager node is the lowest number of the active nodes, the representative node is elected leader of the cluster. The representative node transits from its functions at 325 to be the leader of the cluster. As leader of the cluster, the representative node processes the event stream and outputs the result of the processing.

At 340, the representative node, as leader node, also periodically refreshes it membership with the manager node. This refresh includes refreshing its TTL, which can be accomplished in a number of ways including resetting a timer to an initial value, making the TTL larger in value, or extending the value of the TTL corresponding to some future time for the representative node to terminate as leader. The TTL can be refreshed according to a TTL refresh frequency. The TTL refresh frequency for refreshing the time associated with the TTL can be configurable and may have a default. The default value of the TTL refresh frequency may be, but is not limited to, the TTL value divided by five. With the TTL refreshed, the representative node as current leader continues its leadership role unless some other performance criterion terminates this role before the associated TTL. Such performance criterion can include termination of the leader node in the cluster either as a failure or affirmative removal. The performance criterion can also include terminating the leader node as leader due to slowed execution of one or more events of one or more event streams input to the leader node. The representative node, as leader node, publishes a control event stream to each follower node of the cluster for inter-cluster node synchronization. This publication to each follower node allows the leader node to synchronize with the follower nodes for each event processed by the leader. The representative node, as leader node, publishes the key ID for the event on the control event stream to the follower nodes for the follower nodes to update their DBs to track processing of the event stream by the representative node operating as the leader node. This publication of the key ID for the event on the control event stream can indicate that this event has been processed and the leader node can delete the event from its local cache.

At 345, a determination is made as to whether the cluster has terminated as an event processor for the event stream. If the cluster has not terminated as an event processor for the event stream, the procedure for processing the event stream using a leader node of the cluster to process the event stream and the follower nodes of the cluster to track the processing by the cluster can continue at 320. If the representative node has not relinquished its leadership status, the procedure can move to 340. If the representative node has relinquished its leadership status, another node of the cluster with the query at 320 has a lowest sequence number in the sequence maintained by the manager node and is elected as leader at 330. If the cluster has terminated as an event processor for the event stream, the procedure for processing the event stream terminates at 350.

Figure 4:
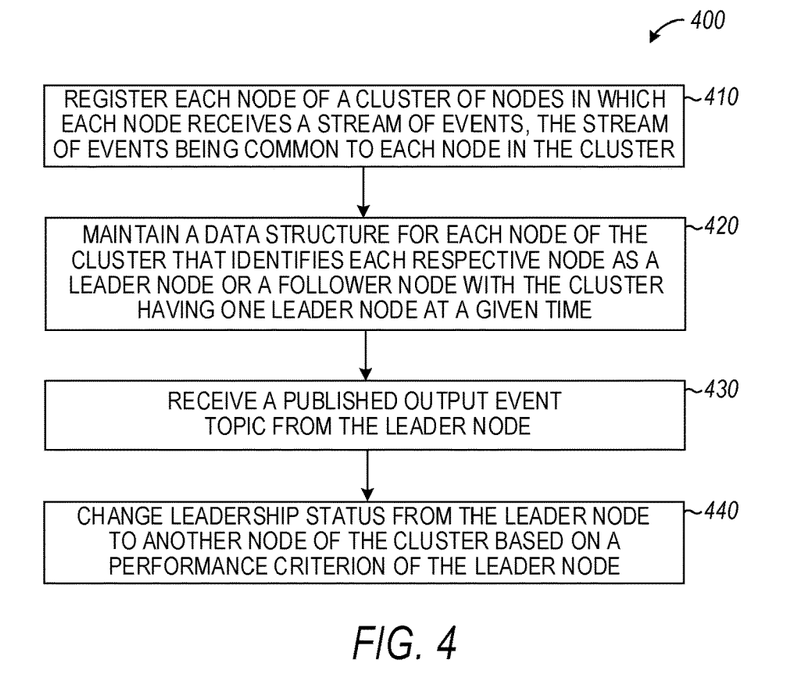
FIG. 4 is a flow diagram of features of an example method associated with processing a stream of events, according to an example embodiment.

FIG. 4 is a flow diagram of features of an embodiment of an example method 400 associated with processing a stream of events. Method 400 can be implemented as a processor-implemented method such as a computer-implemented method that can be implemented by a set of one or more processors executing instructions stored in one or more memory storage devices. At 410, each node of a cluster of nodes is registered, where each node receives a stream of events with the stream of events being common to each node in the cluster. The cluster of nodes can be managed by a manager node for the cluster. Each node can be registered in the manager node for the cluster.

At 420, a data structure is maintained for each node of the cluster that identifies each respective node as a leader node or a follower node with the cluster having one leader node at a given time. The data structure can be maintained in the manager node for the cluster. At 430, a published output event topic is received from the leader node. The published output event can be received in the manager node. For a given cluster, a published output event may be limited to being published only by a leader node to the manager node.

At 440, leadership status is changed from the leader node to another node of the cluster based on a performance criterion of the leader node. The changing of the leadership node can be conducted in the manager node.

Variations of method 400 or methods similar to method 400 can include changing leadership from the leader node to a follower node in response to performance of the leader node matching a performance criterion. Matching a performance criterion of the leader node can include matching the leader node terminating activity, the leader node operating at a rate less than a threshold for a node to operate on an event, or the leader node exceeding a time to live for the leader node. Changing leadership from the leader node to the follower node can include setting a follower node to leadership of the cluster based on a sequence contained in the manager node. Variations of method 400 or methods similar to method 400 can include managing a plurality of clusters by the manager node.

Variations of method 400 or methods similar to method 400 can include a number of different embodiments that may be combined depending on the application of such methods and/or the architecture of systems in which such methods are implemented. Such methods can include processing the stream of events by the leader node of the cluster of nodes; publishing from the leader node an output event topic; and synchronizing the processing of the stream of events by the leader node with the follower nodes of the cluster. Synchronizing the processing of the stream of events by the leader node with the follower nodes of the cluster can include generating a control event stream from the leader node to each follower node of the cluster for the event of the stream being processed, where the control event stream has a unique identifier for the event of the stream being processed by the leader node. Variations of such methods can include maintaining a database of events in each follower node, with respect to the stream of events, to track processing by the leader node.

In various embodiments, a non-transitory machine-readable storage device, such as computer-readable non-transitory media, can comprise instructions stored thereon, which, when performed by a machine, cause the machine to perform operations, where the operations comprise one or more features similar to or identical to features of methods and techniques described with respect to method 400, variations thereof, and/or features of other methods taught herein such as associated with FIGS. 1-4. The physical structures of such instructions may be operated on by one or more processors. For example, executing these physical structures can cause the machine to perform operations comprising: registering, in a manager node, each node of a cluster of nodes in which each node receives a stream of events, the stream of events being common to each node; maintaining, in the manager node, a data structure for each node of the cluster that identifies each respective node as a leader node or a follower node with the cluster having one leader node at a given time; receiving, in the manager node, a published output event topic from the leader node; and changing leadership status, in the manager node, from the leader node to another node of the cluster based on a performance criterion of the leader node. The operations can include changing leadership from the leader node to a follower node in response to performance of the leader node matching a performance criterion.

The instructions can include a number of operations. The operations can include: processing the stream of events by the leader node of the cluster of nodes; publishing from the leader node an output event topic; and synchronizing the processing of the stream of events by the leader node with the follower nodes of the cluster. The operations can include maintaining a database of events in each follower node, with respect to the stream of events, to track processing by the leader node.

Figure 5:
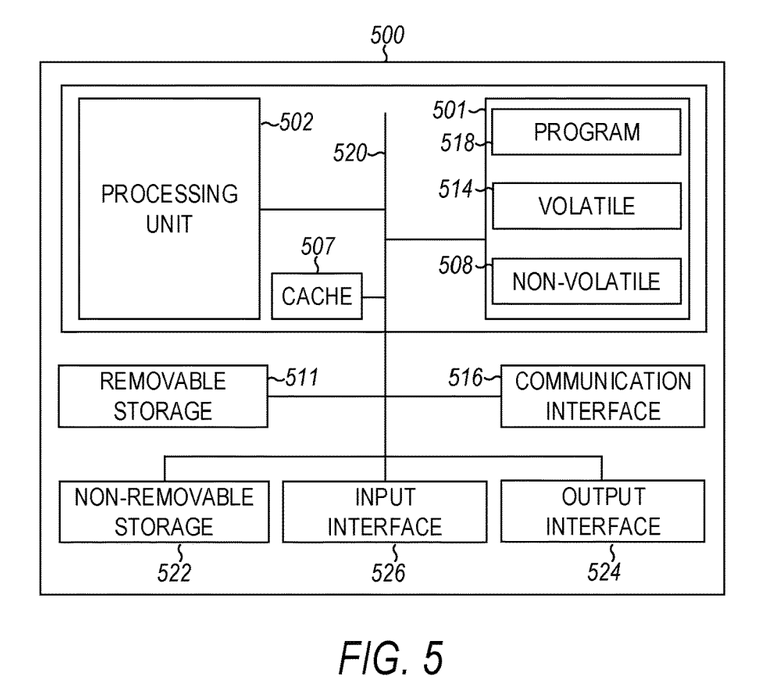
FIG. 5 is a block diagram illustrating circuitry for devices for implementing algorithms and performing methods of conducting event stream processing, according to an example embodiment.

FIG. 5 is a block diagram illustrating circuitry for devices for implementing algorithms and performing methods of conducting event stream processing, according to the teachings herein. FIG. 5 depicts a device 500 having a non-transitory memory storage 501 storing instructions, a cache 507, and a processing unit 502, coupled to a bus 520. Processing unit 502 can include one or more processors operatively in communication with non-transitory memory storage 501 and cache 507. The one or more processors can be structured to execute the instructions to operate device 500 according to any of the methods taught herein. The one or more processors can be structured to execute the instructions to: register each node of the cluster in which each node receives a stream of events, the stream of events being common to each node in the cluster; maintain a data structure for each node of the cluster that identifies each respective node as a leader node or a follower node with the cluster having one leader node at a given time; receive a published output event topic from the leader node; and change leadership status from the leader node to another node of the cluster based on a performance criterion of the leader node.

Device 500 can include a communication interface 516 operable to communicate among types of nodes of the cluster. The communication interface 516 can have the capability to communicate with the other nodes of the cluster to realize inter-node synchronization as a leader node with the other nodes of the cluster or receive as a follower node. The communication interface 516 can have the capability to communicate with the other nodes of the cluster to realize inter-node synchronization as a follower node to receive a control event stream from the leader node of the cluster. The communication interface 516 may be part of a data bus that can be used to receive the event streams for processing.

Non-transitory memory storage 501 may be realized as machine-readable media, such as computer-readable media, and may include volatile memory 514 or non-volatile memory 508. Device 500 may include or have access to a computing environment that includes a variety of machine-readable media including as computer-readable media, such as volatile memory 514, non-volatile memory 508, removable storage 511, or non-removable storage 522. Such machine-readable media may be used with instructions in one or more programs 518 executed by device 500. Cache 507 may be realized as a separate memory component or part of one or more of volatile memory 514, non-volatile memory 508, removable storage 511, or non-removable storage 522. Memory storage can include random access memory (RAM), read only memory (ROM), erasable programmable read-only memory (EPROM), electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Device 500 may include or have access to a computing environment that includes input interface 526 and output interface 524. Output interface 524 may include a display device, such as a touchscreen, that also may serve as an input device. Input interface 526 may include one or more of a touchscreen, touchpad, mouse, keyboard, camera, one or more device-specific buttons, one or more sensors integrated within or coupled via wired or wireless data connections to device 500, and other input devices.

Device 500 may operate in a networked environment using a communication connection to connect to one or more other devices that are remote. Such remote devices may be similar to device 500 or may be different types of devices having features similar or identical to features of device 500 or other features, as taught herein, to handle event stream processing. A plurality of devices similar to device 500 can be used as nodes of a cluster to handle event stream processing. A manager node for the cluster may be realized similar to device 500. The remote devices may include computers, such as database servers. Such remote computers may include a personal computer (PC), server, router, network PC, a peer device or other common network node, or the like. The communication connection may include a Local Area Network (LAN), a Wide Area Network (WAN), cellular, WiFi, Bluetooth, or other networks.

Machine-readable instructions, such as computer-readable instructions stored on a computer-readable medium, are executable by the processing unit 502 of the device 500. A hard drive, CD-ROM, and RAM are some examples of articles including a non-transitory computer-readable medium such as a storage device. The terms machine-readable medium, computer-readable medium, and storage device do not include carrier waves to the extent carrier waves are deemed transitory. Storage can also include networked storage such as a storage area network (SAN).

Device 500 can be realized as a computing device that may be in different forms in different embodiments, as part of a network such as a SDN/IoT network. For example, device 500 may be a smartphone, a tablet, smartwatch, other computing device, or other types of devices having wireless communication capabilities, where such devices include components to engage in the distribution and storage of items of content, as taught herein. Devices, such as smartphones, tablets, smartwatches, and other types of device having wireless communication capabilities, are generally collectively referred to as mobile devices or user equipment. In addition, some of these devices may be considered as systems for the functions and/or applications for which they are implemented. Further, although the various data storage elements are illustrated as part of the device 500, the storage may also or alternatively include cloud-based storage accessible via a network, such as the Internet or server based storage.

Figure 6:
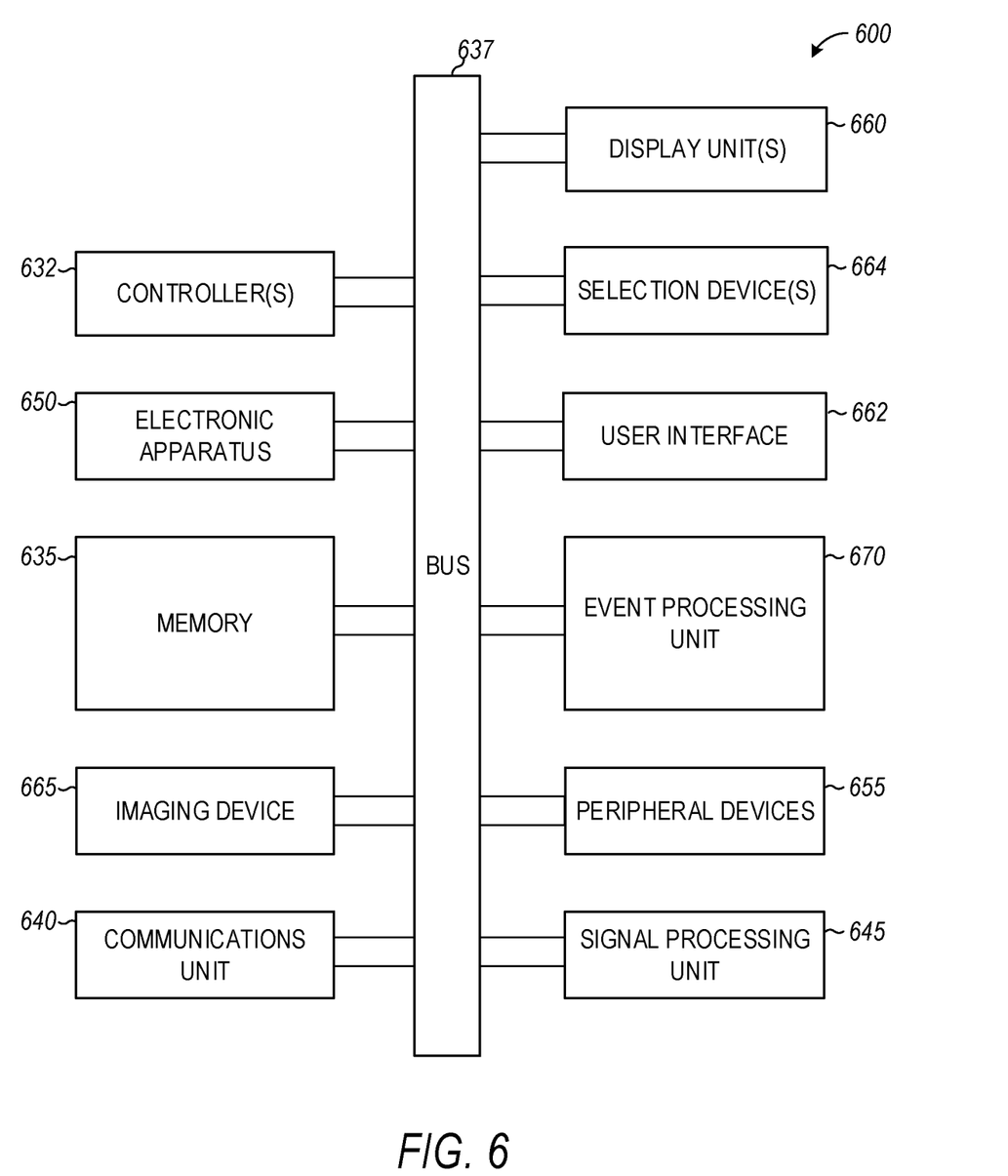
FIG. 6 is a block diagram of features of an example system having an event processing unit, according to an example embodiment.

FIG. 6 is a block diagram of features of an embodiment of an example system 600 having an event processing unit 670. Event processing unit 670 may be implemented to process events of a topic in an event stream in conjunction with nodes arranged as a cluster in which the nodes are in a leader-follower relationship with one node being the leader at any given time, where tracking of node membership and leadership status is conducted in a manager node. Event processing unit 670 may be implemented as a standalone unit that is operable to communicate with other event processing units as nodes of the cluster. Event processing unit 670 may include instructions to operate as a leader node or a follower node at appropriate times in the processing of received event streams. Event processing unit 670 may include instructions to operate as a manager node for one or more clusters to manage membership and leadership status in the respective clusters, as taught herein.

System 600 may also include a number of components such as control controller(s) 632, memory 635, communications unit 640, signal processing unit 645, electronic apparatus 650, peripheral devices 655, display unit(s) 660, user interface 662, selection device(s) 664, and image device 665. Controller(s) 632 provide control circuitry. Controller(s) 632 can be realized as one or more processors, where such processors may operate as a single processor or a group of processors. Processors of the group of processors may operate independently depending on an assigned function. The processors may be implemented to execute instructions stored in event processing unit 670. Controller(s) 632 can be realized in one or more ASICs. Controller(s) 632 may be realized in one or more DSPs. In controlling operation of the components of system 600 to execute schemes associated with the functions for which system 600 is designed, controller(s) 632 can direct access of data to and from a database.

System 600 can include controller(s) 632, memory 635, and communications unit 640 arranged to operate as a processing unit to control functions of event processing unit 670 and to perform operations on data signals collected by event processing unit 670. Controller(s) 632, memory 635, and communications unit 640 may be arranged to operate as an event processing unit. For example, controller(s) 632, memory 635, and communications unit 640 can be arranged to selectively operate as a leader node and a follower node in a cluster arranged to process one or more event streams and to provide publish events of a topic to a client to system 600 via control by a manager node of the cluster. Memory 635 can include a database having information and other data such that system 600 can operate on data to perform functions of system 600. Memory 635 may store events carried in a received event stream and track the processing of each event, where control of the storage can be as a leader node of a cluster or a follower node, including deletion of the events upon completion of processing of the event by the leader node, as taught herein. Depending on the application, communications unit 640 may use combinations of wired communication technologies and wireless technologies.

System 600 can also include a bus 637, where bus 637 provides electrical conductivity among the components of system 600. Bus 637 may include an address bus, a data bus, and a control bus, where each may be independently configured. Bus 637 may be realized using a number of different communication mediums that allows for the distribution of components of system 600. Use of bus 637 can be regulated by controller(s) 632. Bus 637 may be operable as part of a communications network to transmit and receive signals including data signals and command and control signals. Bus 637 may include wired technologies and wireless technologies In various embodiments, peripheral devices 655 may include drivers to provide voltage and/or current input to event processing unit 670, additional storage memory and/or other control devices that may operate in conjunction with controller(s) 632 and/or memory 635. Display unit(s) 660 can be arranged with a screen display that can be used with instructions stored in memory 635 to implement user interface 662 to manage the operation of event processing unit 670 and/or components distributed within system 600. Such a user interface can be operated in conjunction with communications unit 640 and bus 637. Display unit(s) 660 can include a video screen or other structure to visually project data/information and images. System 600 can include a number of selection devices 664 operable with user interface 662 to provide user inputs to operate signal processing unit 645 or its equivalent. Selection device(s) 664 can include a touch screen or a selecting device operable with user interface 662 to provide user inputs to operate signal processing unit 645 or other components of system 600.

In various embodiments, the event processing unit 670 can be implemented to process events of a topic in an event stream in conjunction with nodes arranged as a cluster in which the nodes are in a leader-follower relationship with one node being the leader at any given time, where tracking of node membership and leadership status is conducted in a manager node. Efficient clustering can be achieved by limiting processing of the events of the received event stream by the leader node in which the leader node communicates with the follower nodes using a loosely coupled control event streaming channel for inter-node synchronization of event databases of the nodes of the cluster. The communication may be through eventually consistent asynchronous publish-subscribe communication. A unique identifier, key ID, for the event processed by the leader node can used communicate to the follower nodes via the control event streaming channel, which allows the follower nodes to keep their individual event databases synced through delete/change based updates by the leader node. Such synchronization can be facilitated by all cluster nodes receiving the same set of event stream topics, providing independent event database replication. The set of event stream topics may be received through asynchronous eventually consistent publish-subscribe communications. The leader node can reliably publish processed event stream as output, which is provided to a client of the cluster system. The leadership can be changed among the n nodes of the cluster, which allows the cluster to address failure or slowed processing by the leader node, providing an n−1 aggregation service for stream processing to achieve service high availability.

Further, machine-readable storage devices, such as computer-readable non-transitory media, herein, are physical devices that stores data represented by physical structure within the respective device. Such a physical device is a non-transitory device. Examples of machine-readable storage devices can include, but are not limited to, read only memory (ROM), random access memory (RAM), a magnetic disk storage device, an optical storage device, a flash memory, or other electronic, magnetic, and/or optical memory devices. The machine-readable device may be a machine-readable medium such as memory 635 of FIG. 6. While memory 635 is shown as a single component unit, terms such as "memory," "memory module," "machine-readable medium," "machine-readable device," and similar terms should be taken to include all forms of storage media, either in the form of a single medium (or device) or multiple media (or devices), in all forms. For example, such structures can be realized as centralized database(s), distributed database(s), associated caches, and servers; one or more storage devices, such as storage drives (including but not limited to electronic, magnetic, and optical drives and storage mechanisms), and one or more instances of memory devices or modules (whether main memory; cache storage, either internal or external to a processor; or buffers). Terms such as "memory," "memory module," "machine-readable medium," and "machine-readable device," shall be taken to include any tangible non-transitory medium which is capable of storing or encoding a sequence of instructions for execution by the machine and that cause the machine to perform any one of the methodologies taught herein. The term "non-transitory" used in reference to a "machine-readable device," "medium," "storage medium," "device," or "storage device" expressly includes all forms of storage drives (optical, magnetic, electrical, etc.) and all forms of memory devices (e.g., DRAM, Flash (of all storage designs), SRAM, MRAM, phase change, etc., as well as all other structures designed to store data of any type for later retrieval.

In various embodiments, a system, which is operable to handle event streams for processing, can comprise a memory storage comprising instructions and one or more processors in communication with the memory storage, where the one or more processors can execute the instructions to perform operations comprising management of a cluster of nodes. The instructions to perform operations comprising management of a cluster of nodes can include instructions to perform operations to: register each node of the cluster in which each node receives a stream of events, the stream of events being common to each node in the cluster; maintain a data structure for each node of the cluster that identifies each respective node as a leader node or a follower node with the cluster having one leader node at a given time; receive a published output event topic from the leader node; and change leadership status from the leader node to another node of the cluster based on a performance criterion of the leader node. The system performance criterion of the leader node can comprise the leader node terminating activity, the leader node operating at a rate less than a threshold for a node to operate on an event, or the leader node exceeding a time to live for the leader node.

Variations of a system related to handling event streams for processing, as taught herein, can include a number of different embodiments that may be combined depending on the application of such systems and/or the architecture in which systems are implemented. The operations of such a system can include operations with the system in which the instructions include the cluster of nodes with the leader node arranged to process the stream of events and to synchronize processing of the stream of events with the other nodes of the cluster, where the other nodes of the cluster maintain a database of events with respect to the stream of events to track processing by the leader node. The leader node can be arranged to synchronize processing of each event in the stream with the other nodes of the cluster, using a unique identifier for each event in the stream.

Variations of a system related to handling event streams for processing, as taught herein, can include the stream of events includes at least one event topic that is different from other event topics of the stream. Such systems, as taught herein, can include a particular data structure of a particular node to include a service identification of the service being provided, a time to live for the particular node, a node identification of the particular node, and a sequence number for the particular node indicating a ranking of the particular node among the nodes of the cluster for operation as a leader node. The data structure can include cluster information about the cluster. The cluster can be one of a plurality of clusters being managed by the system.

Although the present disclosure has been described with reference to specific features and embodiments thereof, it is evident that various modifications and combinations can be made thereto without departing from scope of the disclosure. The specification and drawings are, accordingly, to be regarded simply as an illustration of the disclosure as defined by the appended claims, and are contemplated to cover any and all modifications, variations, combinations or equivalents that fall within the scope of the present disclosure.

What is claimed is:

1. A system operable to handle event streams for processing, the system comprising:
   a memory storage comprising instructions; and
   one or more processors in communication with the memory storage, the one or more processors executing the instructions to perform operations comprising management of a cluster of nodes to:
     register a leader node and one or more follower nodes in a manager node of the cluster, the manager node being separate from the leader node and the one or more follower nodes, the leader node and the one or more follower nodes receiving a stream of events for processing by the leader node;
     maintain, in the manager node, a data structure that identifies each node of the cluster as being either a leader node or a follower node, with the cluster having one leader node at a given time, the data structure including identification of a leadership order for the leader node and the one or more follower nodes of the cluster;
     receive, in the manager node, a published output event topic from the leader node, the published output event topic corresponding to an event topic of the stream of events; and
     change, in the manager node, leadership status from the leader node to another node of the cluster to continue processing the stream of events without transferring an event of the stream of events from the leader node to the other node and continue maintaining one leader node of the cluster, the change based on a performance criterion of the leader node and the leadership order of the nodes of the cluster in the data structure.

2. The system of claim 1, wherein the system includes the cluster of nodes with the leader node arranged to process the stream of events and to synchronize processing of the stream of events with the other nodes of the cluster, the other nodes of the cluster maintaining a database of events with respect to the stream of events to track processing by the leader node.

3. The system of claim 2, wherein the leader node is arranged to synchronize processing of each event in the stream with the other nodes of the cluster, using a unique identifier for each event in the stream.

4. The system of claim 1, wherein the stream of events includes at least one event topic that is different from other event topics of the stream.

5. The system of claim 1, wherein the performance criterion of the leader node comprises the leader node terminating activity, the leader node operating at a rate less than a threshold for a node to operate on an event, or the leader node exceeding a time to live for the leader node.

6. The system of claim 1, wherein a particular data structure of a particular node includes a service identification of a service being provided, a time to live for the particular node, a node identification of the particular node, and a sequence number for the particular node indicating a ranking of the particular node among the nodes of the cluster for operation as a leader node.

7. The system of claim 6, wherein the data structure includes cluster information about the cluster.

8. The system of claim 1, wherein the cluster is one of a plurality of clusters being managed by the system.

9. A computer-implemented method comprising:
   registering a leader node and one or more follower nodes in a manager node of a cluster of nodes, the manager node being separate from the leader node and the one or more follower nodes, the leader node and the one or more follower nodes receiving a stream of events for processing by the leader node;
   maintaining, in the manager node, a data structure that identifies each node of the cluster as being either a leader node or a follower node, with the cluster having one leader node at a given time, the data structure including; identification of a leadership order for the leader node and the one or more follower nodes of the duster;
   receiving, in the manager node, a published output event topic from the leader node, the published output event topic corresponding to an event topic of the stream of events; and
   changing leadership status, in the manager node, from the leader node to another node of the cluster to continue processing the stream of events without transferring an event of the stream of events from the leader node to the other node and continue maintaining one leader node of the cluster, the change based on a performance criterion of the leader node and the leadership order of the nodes of the cluster in the data structure.

10. The computer-implemented method of claim 9, wherein the method includes:
processing the stream of events by the leader node of the cluster of nodes;
publishing from the leader node an output event topic; and
synchronizing the processing of the stream of events by the leader node with the follower nodes of the cluster.

11. The computer-implemented method of claim 10, wherein the method includes maintaining a database of events in each follower node, with respect to the stream of events, to track processing by the leader node.

12. The computer-implemented method of claim 10, wherein synchronizing the processing of the stream of events by the leader node with the follower nodes of the cluster includes generating a control event stream from the leader node to each follower node of the cluster for an event of an event stream being processed, the control event stream having a unique identifier for the event of the event stream being processed by the leader node.

13. The computer-implemented method of claim 9, wherein the method includes changing leadership from the leader node to a follower node in response to performance of the leader node matching the performance criterion.

14. The computer-implemented method of claim 13, wherein matching the performance criterion of the leader node includes matching the leader node terminating activity, the leader node operating at a rate less than a threshold for a node to operate on an event, or the leader node exceeding a time to live for the leader node.

15. The computer-implemented method of claim 13, wherein changing leadership from the leader node to the follower node includes setting a follower node to leadership of the cluster based on a sequence contained in the manager node.

16. The computer-implemented method of claim 9, wherein the method includes managing a plurality of clusters by the manager node.

17. A non-transitory computer-readable storage device comprising instructions, which when executed by a set of processors, cause a system to perform operations, the operations comprising:

registering a leader node and one or more follower nodes in a manager node of a cluster of nodes, the manager node being separate from the leader node and the one or more follower nodes, the leader node and the one or more follower nodes receiving a stream of events for processing by the leader node;
maintaining, in the manager node, a data structure that identifies each node of the cluster as being either a leader node or a follower node, with the cluster having one leader node at a given time, the data structure including identification of a leadership order for the leader node and the one or more follower nodes of the cluster;
receiving, in the manager node, a published output event topic from the leader node, the published output event topic corresponding to an event topic of the stream of events; and
changing leadership status, in the manager node, from the leader node to another node of the cluster to continue processing the stream of events without transferring an event of the stream of events from the leader node to the other node and continue maintaining one leader node of the cluster, the change based on a performance criterion of the leader node and the leadership order of the nodes of the cluster in the data structure.

18. The non-transitory computer-readable storage device of claim 17, wherein the operations include:
processing the stream of events by the leader node of the cluster of nodes;
publishing from the leader node an output event topic; and
synchronizing the processing of the stream of events by the leader node with the follower nodes of the cluster.

19. The non-transitory computer-readable storage device of claim 18, wherein the operations include maintaining a database of events in each follower node, with respect to the stream of events, to track processing by the leader node.

20. The non-transitory computer-readable storage device of claim 17, wherein the operations include changing leadership from the leader node to a follower node in response to performance of the leader node matching the performance criterion.

* * * * *

UNITED STATES PATENT AND TRADEMARK OFFICE
CERTIFICATE OF CORRECTION

PATENT NO. : 10,826,984 B2  
APPLICATION NO. : 15/961769  
DATED : November 3, 2020  
INVENTOR(S) : Habib Madani Page 1 of 1

It is certified that error appears in the above-identified patent and that said Letters Patent is hereby corrected as shown below:

In the Claims

In Column 20, Line 57, in Claim 9, delete "including;" and insert --including-- therefor In Column 20, Line 59, in Claim 9, delete "duster;" and insert --cluster;-- therefor Signed and Sealed this  
Twelfth Day of January, 2021

Andrei Iancu  
*Director of the United States Patent and Trademark Office*